E. G. ALBAUGH.
ROLLS FOR HULLING GREEN PEAS ON THE VINE.
APPLICATION FILED JULY 14, 1908.
913,678.
Patented Mar. 2, 1909.
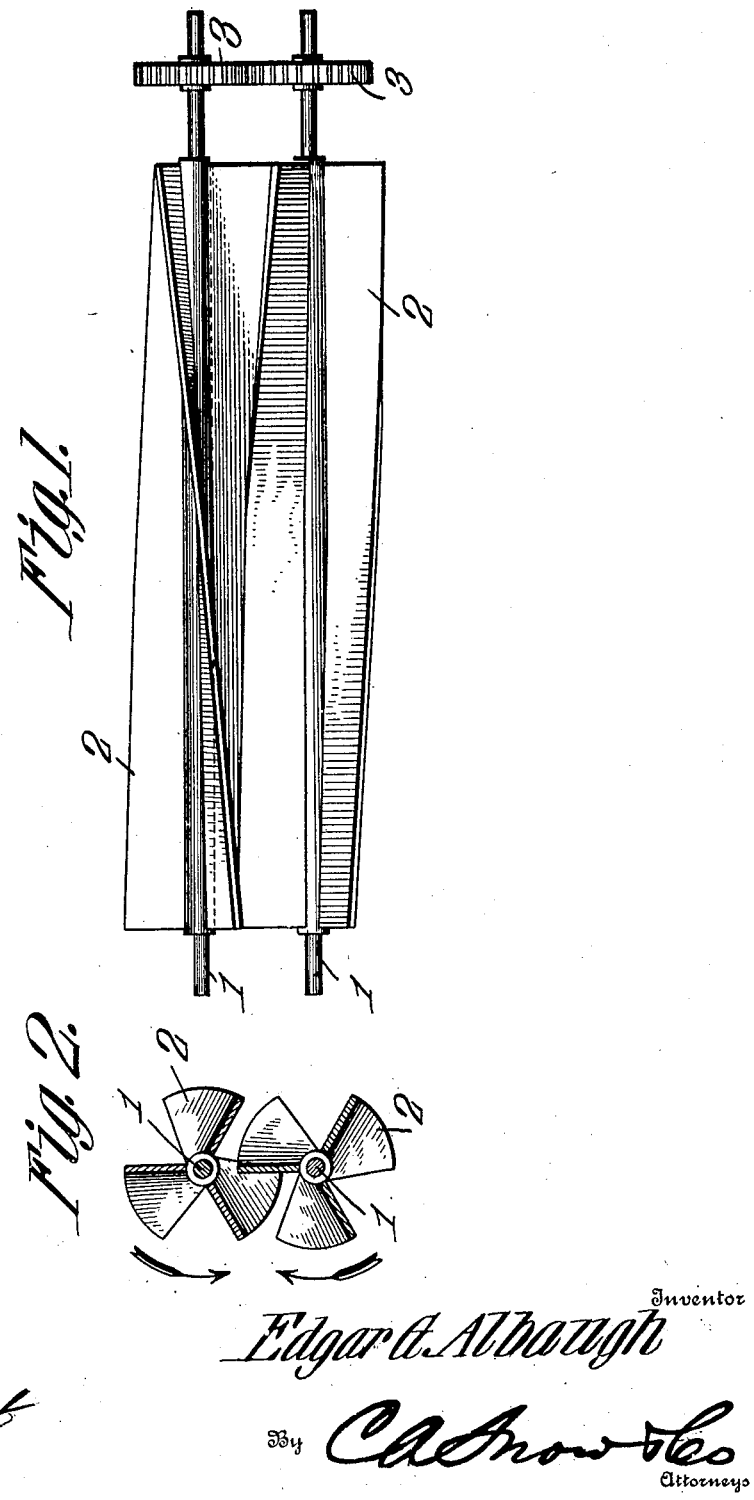

UNITED STATES PATENT OFFICE.

EDGAR G. ALBAUGH, OF FREDERICK, MARYLAND.

ROLLS FOR HULLING GREEN PEAS ON THE VINE.

No. 913,678.  Specification of Letters Patent.  Patented March 2, 1909.

Application filed July 14, 1908. Serial No. 443,521.

*To all whom it may concern:*

Be it known that I, EDGAR G. ALBAUGH, a citizen of the United States, residing at Frederick, in the county of Frederick and State of Maryland, have invented new and useful Rolls for Hulling Green Peas on the Vine, of which the following is a specification.

This invention has relation to rolls for hulling green peas from the vines, and consists in the novel construction and arrangement of its parts, as hereinafter shown and described.

The object of the invention is to provide rolls of peculiar configuration, which are so disposed with relation to each other as to effectually remove green peas and hull the same from the vines, without detriment to the peas.

The rolls consist of shafts which are geared together in such manner as to rotate in opposite directions and upon the said shafts spiral vanes or blades are mounted and the said vanes or blades intermesh with each other, that is to say the outer edge portion of the blades upon one shaft enter in between the outer edge portion of the blades of the other shaft, and vice versa. By providing such an arrangement the pea-vines may be fed in lump masses between the rolls, and as the said blades intersect each other at predetermined points, it is impossible for the lump of the mass of tangled vines to pass through the space between the rolls without being torn apart. By such an arrangement the material may be fed through the rolls automatically or by hand, as desired, as the separation and hulling of the peas is accomplished whether the vines are fed in uniform quantities or in irregular lumps or masses.

In the accompanying drawing Figure 1 is a side elevation of the rolls, and Fig. 2 is an end view of the same.

The rolls are of like configuration and dimension and a description of one will answer for both. Each roll consists of a shaft, 1, which is provided along its length with the spirally disposed vanes or blades, 2. The said vanes or blades 2, are spaced at uniform distances with relation to each other throughout the length of the shafts, 1, and each shaft is provided with a gear wheel 3. The said gear wheels of the two shafts intermesh with each other so that the shafts rotate in opposite directions. The vanes or blades upon one shaft are adapted to intermesh with the vanes or blades upon the other shaft at equal distances between the sides of the adjacent blades, and at the same time are spaced from the blades upon the opposite shaft. By providing such an arrangement or intermeshing between the blades they do not actually have contact with each other but are spaced apart, and, consequently, the vines that are fed between the rolls are not positively engaged or impinged between the blades upon the opposite shafts, and thus as the said shafts rotate the peas are separated from the vines and are hulled without injury or detriment to the same. After the peas have been separated and hulled as above described they are screened in the usual manner by an enlarged drum which surrounds the said rolls.

Having described my invention, what I claim as new and desire to secure by Letters Patent is—

Rolls for stripping and hulling green peas from the vines comprising a pair of parallel shafts arranged to rotate in opposite directions, spiral blades mounted upon each shaft at equal and regular distances apart, said blades being of uniform breadth and length, and each blade having its outer edge along its entire length located at uniform distance from the axis of the shaft upon which the blade is mounted, and the outer edge of each blade at all points along its length being at the same distance from the axis of the shaft other than that upon which it is mounted when the said points along the lengths of the outer edge of each blade are successively moved into a plane in which the axis of the two shafts are located, the breadth of the blades being less than the distance between the shafts, but greater than half of the distance between the shafts, the blades upon one shaft being spaced from the blades upon the other shaft in their intermeshed relation.

In testimony that I claim the foregoing as my own, I have hereto affixed my signature in the presence of two witnesses.

EDGAR G. ALBAUGH.

Witnesses:
  JAS. M. WALKER,
  L. E. PREINKERT.